(12) United States Patent
    Suffolk et al.

(10) Patent No.: US 10,199,721 B2
(45) Date of Patent: Feb. 5, 2019

(54) VEHICLE ANTENNA

(71) Applicant: Jaguar Land Rover Limited, Coventry (GB)

(72) Inventors: James Suffolk, Coventry (GB); Phil Stuchfield, Coventry (GB)

(73) Assignee: Jaguar Land Rover Limited, Coventry, Warwickshire (GB)

( * ) Notice: Subject to any disclaimer, the term of this patent is extended or adjusted under 35 U.S.C. 154(b) by 84 days.

(21) Appl. No.: 15/500,999

(22) PCT Filed: Aug. 12, 2015

(86) PCT No.: PCT/EP2015/068562
§ 371 (c)(1),
(2) Date: Feb. 1, 2017

(87) PCT Pub. No.: WO2016/026750
PCT Pub. Date: Feb. 25, 2016

(65) Prior Publication Data
US 2017/0229767 A1    Aug. 10, 2017

(30) Foreign Application Priority Data
Aug. 20, 2014   (GB) .................................. 1414782.1

(51) Int. Cl.
*H01Q 1/32*    (2006.01)
*H01Q 9/40*    (2006.01)
*H01Q 21/28*   (2006.01)
*B62D 35/00*   (2006.01)
*H01Q 21/06*   (2006.01)

(52) U.S. Cl.
CPC .......... *H01Q 1/3275* (2013.01); *B62D 35/007* (2013.01); *H01Q 9/40* (2013.01); *H01Q 21/065* (2013.01); *H01Q 21/28* (2013.01)

(58) Field of Classification Search
CPC ...... H01Q 1/3275; H01Q 9/40; H01Q 21/065; B62D 35/007
See application file for complete search history.

(56) References Cited

U.S. PATENT DOCUMENTS

| 4,395,713 | A  | 7/1983 | Nelson et al. |
| 5,106,141 | A  | 4/1992 | Mostashari |
| 5,177,493 | A  | 1/1993 | Kawamura |
| 6,204,820 | B1 | 3/2001 | Jensen, Jr. |
| 9,019,161 | B1 | 4/2015 | Billsberry et al. |

(Continued)

FOREIGN PATENT DOCUMENTS

| DE | 102004026764 A1 | 12/2005 |
| DE | 102009038038 A1 | 2/2011 |

(Continued)

OTHER PUBLICATIONS

Pell et al., Advancements in Automotive Antennas, Jan. 8, 2011, RMIT University Australia, pp. 523-524.*

(Continued)

*Primary Examiner* — Dameon E Levi
*Assistant Examiner* — David E Lotter
(74) *Attorney, Agent, or Firm* — Myers Bigel, P.A.

(57) ABSTRACT

Embodiments of the present invention provide an aerodynamic device for a vehicle, comprising one or more antenna elements arranged to extend from a surface of the aerodynamic device.

20 Claims, 3 Drawing Sheets

(56) References Cited

U.S. PATENT DOCUMENTS

| | | | |
|---|---|---|---|
| 2006/0055204 A1* | 3/2006 | Mathew | B62D 35/007 |
| | | | 296/181.1 |
| 2011/0140988 A1* | 6/2011 | Toniolo | H01Q 1/3275 |
| | | | 343/893 |
| 2012/0223862 A1 | 9/2012 | Kerselaers | |
| 2015/0311582 A1* | 10/2015 | Hu | H01Q 1/241 |
| | | | 343/727 |

FOREIGN PATENT DOCUMENTS

| | | |
|---|---|---|
| EP | 1376756 A2 | 1/2004 |
| EP | 2495809 A1 | 9/2012 |
| FR | 2886063 A1 | 11/2006 |
| FR | 2948906 A1 | 2/2011 |
| GB | 672034 | 5/1952 |
| JP | S 63-44885 U | 3/1988 |
| JP | S 63-44886 U | 3/1988 |
| JP | H 045184 A | 1/1992 |
| JP | 2001-102826 A | 4/2001 |
| JP | 2001105975 A | 4/2001 |
| JP | 2005104330 A | 4/2005 |
| JP | 3187451 U | 11/2013 |
| JP | 2014076646 A | 4/2014 |
| WO | WO 2006/108608 A1 | 10/2006 |
| WO | WO 2009/065806 A1 | 5/2009 |

OTHER PUBLICATIONS

Combined Search and Examination Report, GB Application No. 1414782.1, dated Feb. 17, 2015, 8 pages.
Combined Search and Examination Report, GB Application No. 1514284.7, dated Feb. 4, 2016, 10 pages.
Notification of Transmittal of the International Search Report and the Written Opinion of the International Searching Authority, or the Declaration, PCT/EP2015/068562, dated Nov. 17, 2015.
First Office Action and English language translation, CN Application No. 201580043985.9, dated Nov. 5, 2018, 20 pp.

\* cited by examiner

VEHICLE ANTENNA

RELATED APPLICATIONS

This application is a 35 U.S.C. § 371 national stage application of PCT Application No. PCT/EP2015/068562, filed on Aug. 12, 2015, which claims priority from Great Britain Patent Application No. 1414782.1 filed on. Aug. 20, 2014, the contents of which are incorporated herein by reference in their entireties. The above-referenced PCT International Application was published in the English language as International Publication No. WO 2016/026750 A1 on Feb. 25, 2016.

TECHNICAL FIELD

Aspects of the invention relate to a vehicle antenna and particularly, but not exclusively, to an aerodynamic device comprising one or more antennas. Aspects of the invention relate to a device, to an antenna array and to a vehicle.

BACKGROUND

It is desired to provide vehicles with increasing communication capabilities, such as the ability to transmit and receive increased amounts of data. The data may include data relating to navigation, voice communication, multimedia and data communication. Data communication may relate to vehicle systems and data utilised by vehicle occupants or communication systems outside of the car. In order to support such communication capabilities it is necessary to provide the vehicle with one or more antennas. Effectively arranging those antennas about a vehicle may be challenging, especially when faced with different vehicle designs.

In particular it is increasingly desired to form vehicle body panels from materials such as composites, for example to save weight, to allow complex designs or aesthetic forms of body panels, which may not be suitable to form an antenna ground plane. Similarly it is an increasing trend in vehicle design to form vehicle roofs from transparent materials which may not be suitable to form an antenna ground plane. It is also often desired to provide vehicles with increasingly larger opening portions, such as sunroofs, which slide rearward from above front, and sometimes also rear, occupants of the vehicle. With such opening portions roof-mounted antenna can foul the rearward movement of the opening portion.

It is an object of embodiments of the invention to at least mitigate one or more of the problems of the prior art. It is an object of embodiments of the invention to provide an antenna system for a vehicle which is compatible with various vehicle designs and styles.

SUMMARY OF THE INVENTION

According to an aspect of the present invention there is provided an aerodynamic device for a vehicle, comprising one or more antenna elements arranged to extend from a surface of the aerodynamic device. Advantageously providing antennas on an aerodynamic device allows for convenient location of the antennas.

According to an aspect of the present invention there is provided an aerodynamic device for a vehicle, comprising:
first and second antenna elements arranged to extend from a surface of the aerodynamic device,
wherein the first and second antenna elements are spaced apart along a first axis,
wherein the device further comprises a conductive layer arranged generally perpendicular to the first and second antenna elements, and
wherein the first and second antenna elements are generally aligned with a second axis, said second axis being perpendicular to the first axis.

In some embodiments antenna or antennas may be 4G antennas. As will be understood by the skilled person, a 4G antenna must be suitable for transmitting and/or receiving signals in a 4G telecommunications band, for example a 4G telecommunications band based on Long Term Evolution (LTE) in a 2.6 GHz frequency band. The skilled person will further understand that 4G antennae will be required to be at least theoretically suitable for transmitting and/or receiving data at the rates required by 4G standards.

The one or more antenna elements may be generally aligned with a longitudinal axis. The antennas may be arranged for airflow over the device. The longitudinal axis may be that of the vehicle.

The one or more antenna elements may be patch antennas. Each patch antenna may have a polygonal shape; optionally the shape is T or L-shaped. Advantageously the antennas may be used for data communication.

The aerodynamic device may comprise a plurality of antenna elements. Advantageously the plurality of antennas may increase a data throughput.

At least some of the antenna elements may be spaced apart in a first axis, which may be a lateral axis. The antenna elements are spaced apart to decorrellate the antennas. Advantageously the spacing apart may provide for decorrellation between transmit and receive antennas.

The antenna elements may be spaced apart by at least one quarter of a wavelength. The antenna elements are spaced apart by at least 1 mm, 10 mm or 50 mm. The antenna elements are spaced apart by approximately 100 mm; optionally the antenna elements may be are space apart by approximately 101 mm. The spacing may be determined based on a wavelength of signal.

The aerodynamic device may, comprise at least four antenna elements.

At least two antenna elements may be aligned in a second axis, which may be the longitudinal axis.

At least first and second pairs of antenna elements may be spaced apart in the lateral axis.

One or more antenna elements may extend from an upper surface of the aerodynamic device.

The aerodynamic device may, comprise a conductive layer arranged generally perpendicular to the one or more antenna elements. Advantageously the conductive layer may improve signal reception or transmission.

The conductive layer may be arranged to form a ground plane for the one or more antenna elements.

The ground plane formed by the conductive layer may have an area of between 22500 mm and 90000 mm. For example, the ground plane may be generally square, having a side length between 150 mm and 300 mm. In an embodiment the ground plane may be square, having a side length of approximately 200 mm. Advantageously, the present invention allows an antenna with a relatively small ground plane to be produced. This may reduce the impact of the antenna on the dimensions of the aerodynamic device.

The conductive layer may be arranged within the aerodynamic device.

The conductive layer may be arranged beneath a surface of the aerodynamic device.

The one or more antenna elements may be arranged within one or more radomes. The radomes may advantageously seal the antenna from the environment.

An upper portion of each radome may be removable. This allows for convenient access.

The aerodynamic device may be a spoiler. The aerodynamic device may comprise one or more of an illumination means, a washing means and a wiping means. The antennas may be spaced apart to straddle one or more of the illumination means, washing means or wiping means.

According to an aspect of the present invention there is provided a vehicle comprising the aerodynamic device of any preceding aspect.

The aerodynamic device may be arranged at a rear portion of the vehicle.

The aerodynamic device may be arranged to form a generally continuous surface with a roof of the vehicle.

According to an aspect of the present invention there is provided an antenna array for a vehicle, comprising a plurality of antenna elements spaced apart in a lateral axis of the vehicle. Advantageously this allows for increased data throughput.

According to an aspect of the present invention there is provided an antenna array for a vehicle, comprising a plurality of antenna elements generally aligned with a first axis and spaced apart along a second axis, wherein the second axis is perpendicular to the first axis, and wherein the antenna array further comprises a conductive layer arranged generally perpendicular to the antenna elements.

The antenna elements may be generally aligned with a longitudinal axis of the vehicle. The one or more antenna elements may be patch antennas. Each patch antenna may be a polygonal shape; optionally the shape is T or L-shaped.

The antenna elements may be spaced apart to decorrelate the antennas.

The antenna elements may be spaced apart by at least one quarter of a wavelength.

The antenna elements may be spaced apart by at least 1 mm, 10 mm or 50 mm.

The antenna elements may be spaced apart by approximately 100 mm; optionally the antenna elements are space apart by approximately 101 mm.

The antenna array may, comprise one or more further antenna elements aligned with one or more of the antenna elements in the longitudinal axis Each of the further antenna elements is aligned with one of the antenna elements in the longitudinal axis.

The antenna array may comprise at least two antenna elements aligned in the longitudinal axis.

The plurality of antenna elements may be arranged within a plurality of antenna fins each spaced in the lateral axis of the vehicle.

The plurality of antenna fins may be generally asymmetric about a central longitudinal axis of the vehicle.

Each antenna fin is arranged to enclose a plurality of antenna elements.

The plurality of antenna elements may be arranged upon an aerodynamic device.

The plurality of antenna elements may be arranged to extend upwardly from an upper surface of the aerodynamic device. The aerodynamic device may be a spoiler.

The antenna array may comprise a conductive layer arranged generally perpendicular to the antenna elements. The conductive layer may be arranged to form a ground plane for the one or more antenna elements.

The conductive layer may be arranged within the aerodynamic device.

The plurality of antenna elements may be provided for mounting upon a roof of the vehicle.

According to an aspect of the present invention there is provided a vehicle comprising the antenna array of any preceding aspect.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the invention will now be described, by way of example only, with reference to the accompanying figures, in which.

DETAILED DESCRIPTION

Figure 1:
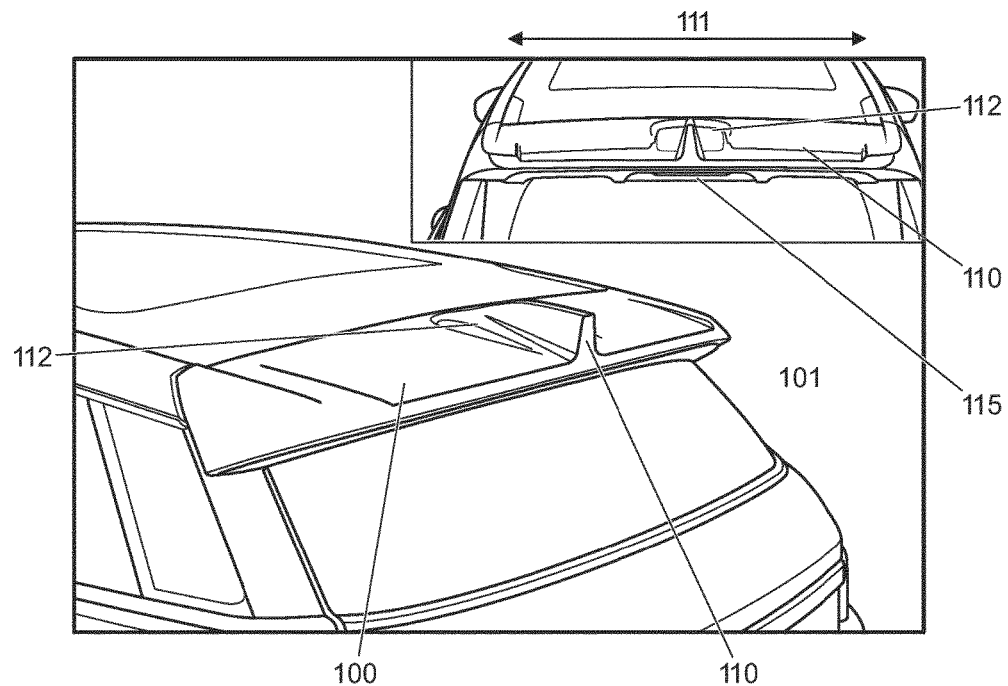
FIG. 1 shows an illustration of a vehicle having an aerodynamic device according to an embodiment of the invention.

FIG. 1 illustrates a portion of a vehicle, generally denoted as 101, having an aerodynamic device 100 mounted thereon. The aerodynamic device 100 comprises at least one radome, or housing, 110 for an antenna. The radome 110 may also be known as an antenna fin due to its fin-like shape, although it will be realised that other shapes may be envisaged.

An orientation of a lateral axis 111 is illustrated with reference to an insert portion of FIG. 1 which corresponds to the lateral axis of the vehicle 101. A longitudinal axis of the aerodynamic device 100 is aligned with the lateral axis 111, and a lateral axis of the aerodynamic device 100 is aligned with a longitudinal axis of the vehicle. For clarity further references to longitudinal and lateral axes will be with regard to the axes of the vehicle. However it will be appreciated that the axes may alternatively be defined with respect to the axes of the aerodynamic device, wherein the longitudinal axis of the aerodynamic device 100 corresponds to a longest axis of the aerodynamic device 100.

The aerodynamic device 100 is a spoiler for directing airflow about the vehicle 101, although it will be realised that the aerodynamic device 100 may have minimal aerodynamic influence and may be primarily for aesthetic purposes. The spoiler may also be referred to as a "wing" or the like. The aerodynamic device 100 may be for mounting generally at a rear of the vehicle 101. The aerodynamic device 100 shown in FIG. 1 is arranged to extend rearwardly from a declined surface of the vehicle 101, such as from a rear window or tailgate of the vehicle. An upper surface of the aerodynamic device 100 may be substantially aligned with a roof of the vehicle 101 to provide a generally continuous surface. The aerodynamic device 100 may be mounted to the tailgate of the vehicle 101 such that the aerodynamic device 100 is moveable with the tailgate. It will be realised that other arrangements of the aerodynamic device 100 may be envisaged.

As illustrated in the inset portion of FIG. 1, the aerodynamic device 100 may comprise illumination means 115 such as one or more light emitting devices. The illumination means may be arranged to illuminate to indicate braking or retardation of the vehicle and may be arranged in a trailing edge of the aerodynamic device 100. Furthermore, although not shown in FIG. 1, the aerodynamic device 100 may comprise means for wiping and/or washing a window of the vehicle in proximity to the aerodynamic device 100, such as the rear window of the vehicle 101 below the aerodynamic device 100. The means for wiping and/or washing may comprise one or more motors and a wiper arm arranged to, in use, move across the window to remove water and/or dirt. The means for wiping and/or washing may comprise a means for spraying water onto the rear window.

As noted above, the aerodynamic device 100 comprises a radome 110. It will be understood that the term radome does not imply that the antenna arranged therein is limited to use with radar frequencies and the term housing may be used equivalently. The term radome is intended to mean a generally weather-proof enclosure for the antenna. The radome 110 illustrated in FIG. 1 is arranged in a generally central portion of the aerodynamic device 100. That is, the radome 110 is arranged to be central about the lateral axis 111. The radome 110 extends upwardly from the aerodynamic device 100. In some embodiments of the invention a plurality of radomes 110 may be arranged upon the aerodynamic device 100. The plurality of radomes 110 may be spaced along the lateral axis 111, such as at regular intervals along the aerodynamic device 100. In one particular embodiment the aerodynamic device may include first and second radomes 110 spaced a substantially equal distance along the lateral axis from a centre of the aerodynamic device 100.

The radome 110 may be formed integrally with the aerodynamic device 100, for example as a single component, or may be formed to have a removeable portion. The removeable portion may be a top portion of the radome 110. The removeable portion may allow access, such as for maintenance, to the one or more antennas mounted within the radome 110. The aerodynamic device 100 and radome 110 may be manufactured from metal or plastic material, or a combination thereof.

As will be explained, each radome 110 may enclose one or more antennas 120, 130. Each antenna 120, 130 may be arranged to extend from the aerodynamic device 100. The one or more antennas may be patch antennas. Each patch antenna may be formed by a patch or area of conductive material. It will be understood that the term patch antenna does not imply that the antenna is rectangular. Each antenna may be otherwise shaped, such as having a polygonal shape, a T-shape, an L-shape etc. Each patch antenna may be formed on a substrate. The substrate may be non-conductive. The substrate may be planar or otherwise shaped e.g. curved. A major surface of each antenna 120, 130 may be perpendicular to a major surface, such as the upper surface, of the aerodynamic device 100.

As illustrated in FIG. 1, in some embodiments the aerodynamic device 100 comprises a raised region 112 around a base of the radome 110. The raised region 112 may house a ground plane for the antenna(s) 120, 130 within the radome 110. The ground plane may be formed by a generally planar conductive element arranged within, or beneath, the raised surface 112 of the aerodynamic device 100. The conductive element may be formed from a metallic sheet.

Figure 2:
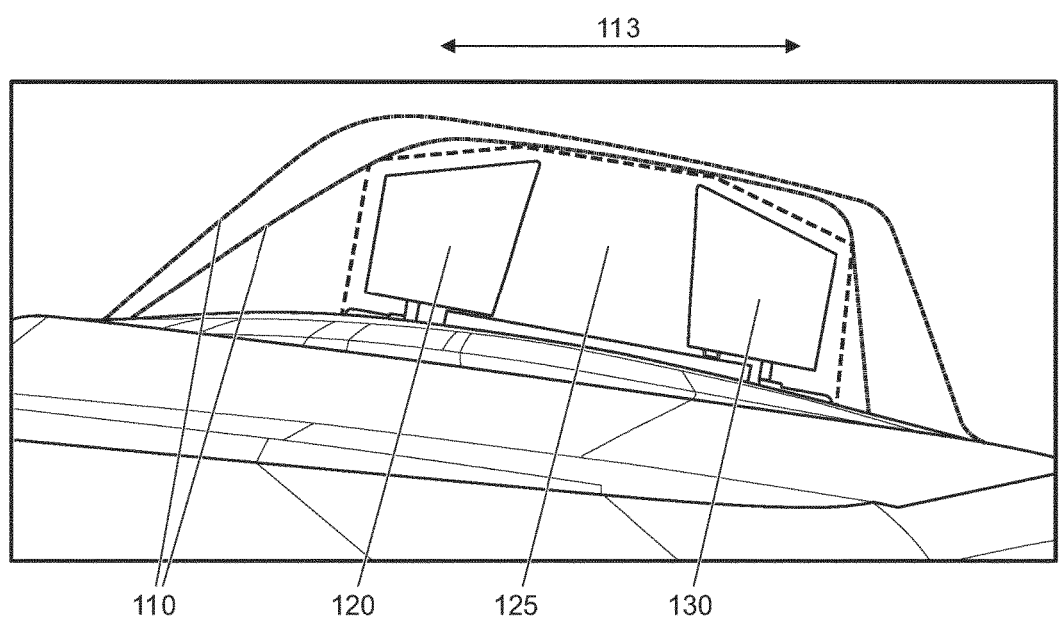
FIG. 2 shows an illustration of an antenna array according to an embodiment of the vehicle.

FIG. 2 illustrates a side view of an antenna array, generally 125, arranged upon the aerodynamic device 100. The view shown in FIG. 2 is generally looking into, or aligned with, the lateral axis 111. Axis 113 illustrated with reference to FIG. 2 is a longitudinal axis 113 of the vehicle 101. The antenna array 125 is arranged within the radome 110. The radome 110 may have various profiles, such as those illustrated in FIG. 2, which cover the antenna array 120, 130.

The antenna array 125 illustrated in FIG. 2 comprises first 120 and second 130 patch antennas, although it will be realised that the array 125 may comprise other numbers of antenna such as one or a plurality, more than two, of antennas. The antennas 120, 130 are each a patch antenna. Each antenna 120, 130 is generally aligned with the longitudinal axis 113, although in some embodiments one or more of the antenna 120, 130 may be offset from, or angled with respect to, the longitudinal axis 113. The offset may be relatively small, such as less than 10 degrees or less than 5 degrees. The plurality of antennas 120, 130 are together generally aligned in the longitudinal axis 113.

Advantageously the offset may allow the radome 110 covering the antennas 120, 130 to be shaped or to have curved or angled sides which may improve aerodynamic properties of the radome 110 or allow easier manufacture of the aerodynamic device 100 and radome 110 including the application of paint to the assembled the aerodynamic device 100 and radome 110.

Each of the antennas 120, 130 forming the array 125 comprises a conductive element for transmitting and/or receiving electromagnetic. The element may be a shaped element, such as a non-linear element. The element may be a planar element. However the element may also be curved. The element may be formed upon a backing substrate, such as a polycarbonate, polyimide substrate or the like. The element may be formed as a printed circuit element on a backing substrate, which may be solid or flexible. The element may be formed on a printed circuit board (PCB). One or more of the antennas 120, 130 may have conductive elements arranged on both sides of the backing substrate. The antenna elements 120, 130 may have a uniform shape or may be differently shaped. That is, the first antenna 120 may have a different shape to the second antenna 130 which advantageously allows the radome 110 to adopt a profile which varies along its length i.e. lengthwise in the longitudinal axis 113. For example the radome 110 may have a generally inclined forward portion and a substantially vertical rear portion as shown in FIG. 1. It will be realised that other profiles may be envisaged, as depicted in FIG. 2.

The antenna array 125 may be for communication with a cellular telecommunication network. The antenna array 125 may comprise a plurality of antennas in order to improve a data throughput of the array 125 or to improve a signal-to-noise ratio of the antenna. One or more antenna may be provided for receiving wireless navigation signals, such as those broadcast from satellites, to allow an apparatus receiving those signals to determine its geographic location. The radome 110 may also house other antennas which are not patch antennas.

Advantageously having an antenna mounted upon an aerodynamic device allows antennas to be provided about a vehicle in various locations. These locations may include, without limitation, mirrors, bumpers, roof racks or rails of the vehicle. This eliminates a need to mount an antenna on a roof or other body panel of the vehicle. In particular by avoiding a need to mount an antenna on the roof of the vehicle the roof may be manufactured from non-conductive or non-metallic materials, such as composites, plastics, glass and carbon fibre, although this list is not exclusive. Furthermore, by removing a need to mount an antenna on the roof of the vehicle the roof may be manufactured from a transparent material, so as to allow a full-length panoramic roof, or may allow a portion of the roof to move rearward along the vehicle to reside above the rear portion of the roof.

FIGS. 3 to 6 illustrate an antenna array for a vehicle, denoted generally as 300, according to an embodiment of the invention. The antenna array of FIGS. 3 to 6 comprises a plurality of antennas spaced apart in a lateral axis of a vehicle.

Figure 6:
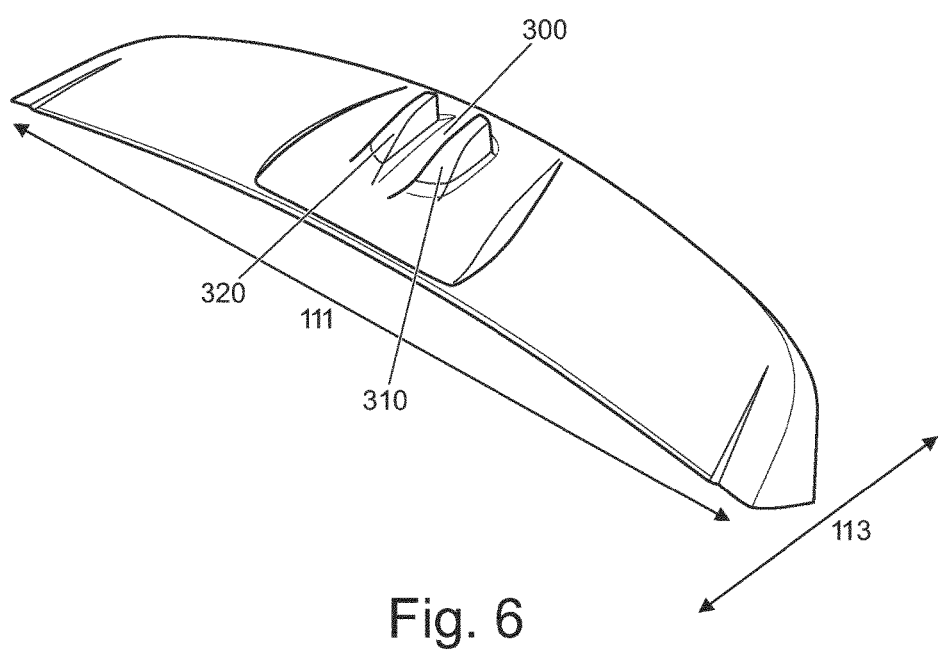
FIG. 6 shows an aerodynamic device according to an embodiment of the invention.

As is most easily appreciated from FIG. 6, the antenna array 300 comprises first and second antenna fins 310, 320, although it will be realised that the antenna array 300 may comprises more than two fins 310, 320. For example the antenna array may comprise more than three or four antenna fins. Referring to FIG. 6 the antenna fins 310, 320 are shown mounted upon an aerodynamic device, such as a spoiler, as described with reference to FIGS. 1 and 2. However it will be realised that the antenna array 300 may be arranged upon a roof or other portion of a vehicle. It will also be realised that the antennas may not be fins and may comprise an otherwise shaped enclosure which encloses one or more antennas.

Figure 3:
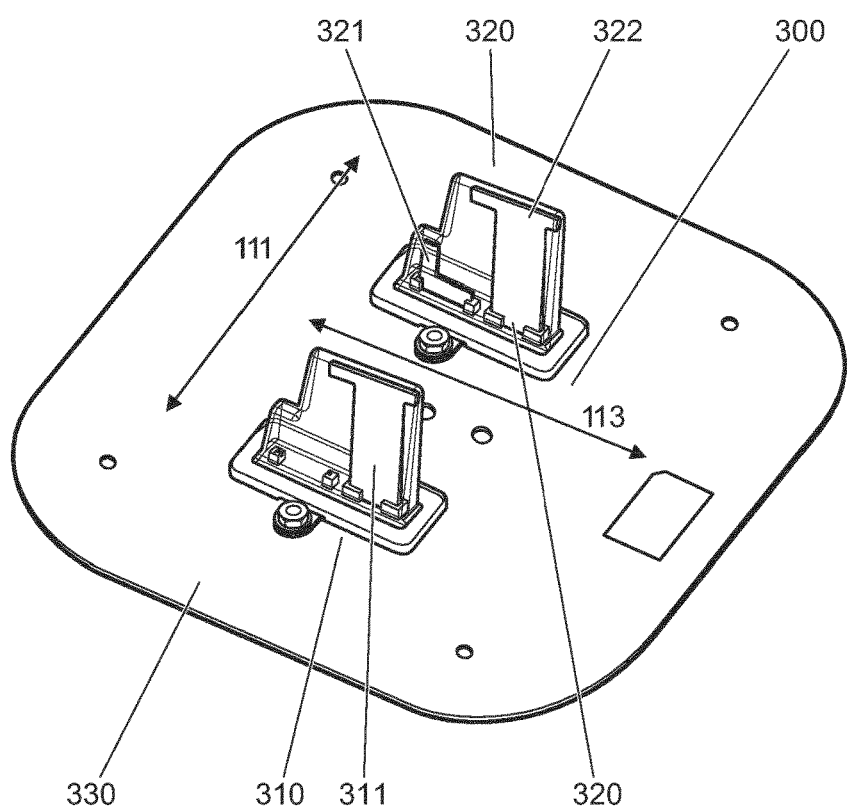
FIG. 3 shows a cut-away illustration of an antenna array according to an embodiment of the invention.
Figure 4:
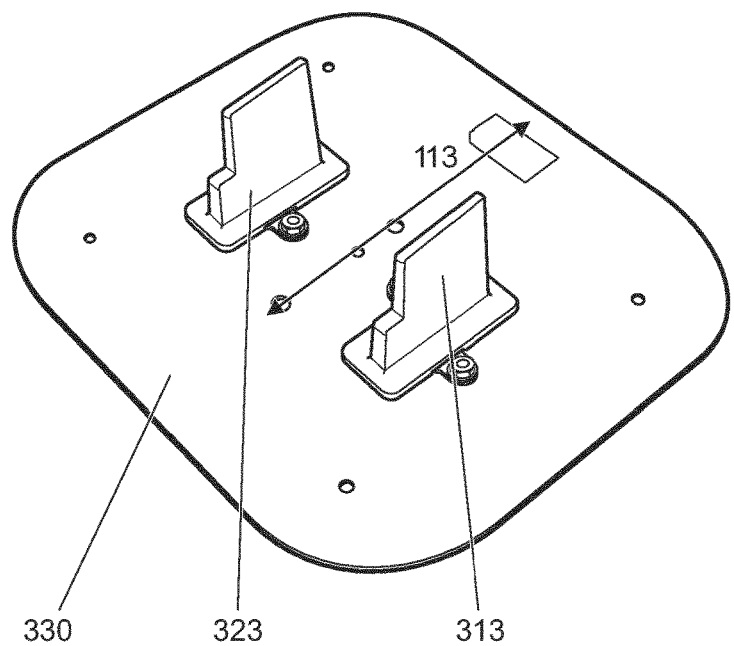
FIG. 4 shows a further illustration of an antenna array according to an embodiment of the invention.

The antenna fins 310, 320 are arranged to be spaced apart in a lateral axis 111 which is illustrated in the figures using the same reference numerals as in FIG. 1 for clarity and corresponds to the same axis as illustrated in FIG. 1. The antenna fins 310, 320 are arranged to be, at least partly, in lateral alignment. That is, when viewing along the lateral axis 111 the antenna fins 310, 320 are arranged to at least partly overlap, or to be generally aligned as shown in FIGS. 3, 4 and 6. It will be realised that, in some embodiments, one or more antenna fins may be partly offset in the longitudinal axis 113 with respect one or more other antenna fins Each antenna fin 310, 320 forms a radome as particularly shown in FIG. 6 and shown in cut-away form in FIG. 5. The radome 310, 320 is arranged to enclose one or more antennas, as will be explained particularly with reference to FIG. 3. It will be understood that the term radome does not mean that the antennas are only suitable for use with radar frequencies and may be used for communication or navigation, for example.

Referring to FIG. 3, each antenna fin 310, 320 comprises of one or more antennas. The antennas may be patch antennas 311, 321, 322. Each patch antenna may be formed by a patch or area of conductive material. It will be understood that the term patch antenna does not imply that the antenna is rectangular. Each antenna may be otherwise shaped, such as having a polygonal shape, a T-shape, an L-shape etc. Each patch antenna may be formed on a substrate. The substrate may be non-conductive. The substrate may be planar or otherwise shaped e.g. curved.

As illustrated in FIG. 3 a first antenna fin 310 comprises one antenna 311 and the second antenna fin 320 comprises first and second 321, 322 antennas. Thus it will be realised that the antenna fins 310, 320 may comprise equal or unequal numbers of antennas.

The antennas may be shaped to be a polygon including L-shaped, such as antenna 321 or T-shaped such as antennas 311, 322. Each antenna fin 310, 320 may comprise differently shaped antennas, such as fin 320. Each antenna fin may be around 60 mm in height although it will be realised that other heights may be selected.

The antenna fins 310, 320 are generally aligned with the longitudinal axis 113, although in some embodiments one or more of the antenna fins 310, 320 may be offset from, or angled with respect to, the longitudinal axis 113. The offset may be relatively small, such as less than 10 degrees or less than 5 degrees. The antenna fins 310, 320 may be asymmetric with respect to each other. Advantageously the offset allows the antenna fins 310, 320 to be shaped or to have curved or angled sides which may improve aerodynamic properties thereof or allow easier manufacture of the antenna fins 310, 320 including the application of paint thereto.

The one or more antennas 311, 321, 322 within each fin 310, 320 may be arranged within an enclosure 313, 323 such as illustrated in FIG. 4 and shown in cut-away in FIG. 3. The enclosure may be a removable cover 313, 323 arranged to fit relatively closely around the antennas. The cover 313, 323 may be provided to protect the antennas 311, 321, 322 which may be relatively fragile or sensitive. As illustrated in FIG. 4 the cover 313, 323 may be secured with bolts or other removable fastenings.

Further referring to FIGS. 3 and 4, the antennas 311, 321, 322 may be arranged upon a ground plane 330. The ground plane is a conductive surface arranged perpendicular to an orientation of the antennas 311, 321, 322. The ground plane 330 is provided to reflect or direct radio waves broadcast from the antennas 311, 321, 322 and may be connected to an electrical ground of the antennas. 311, 321, 322. In some embodiments the ground plane 330 may be formed by a body panel of a vehicle, such as a roof of the vehicle. However in other embodiments such as that shown in FIG. 6 where the antennas are provided on an aerodynamic device, the ground plane 330 may be separate element.

Figure 5:
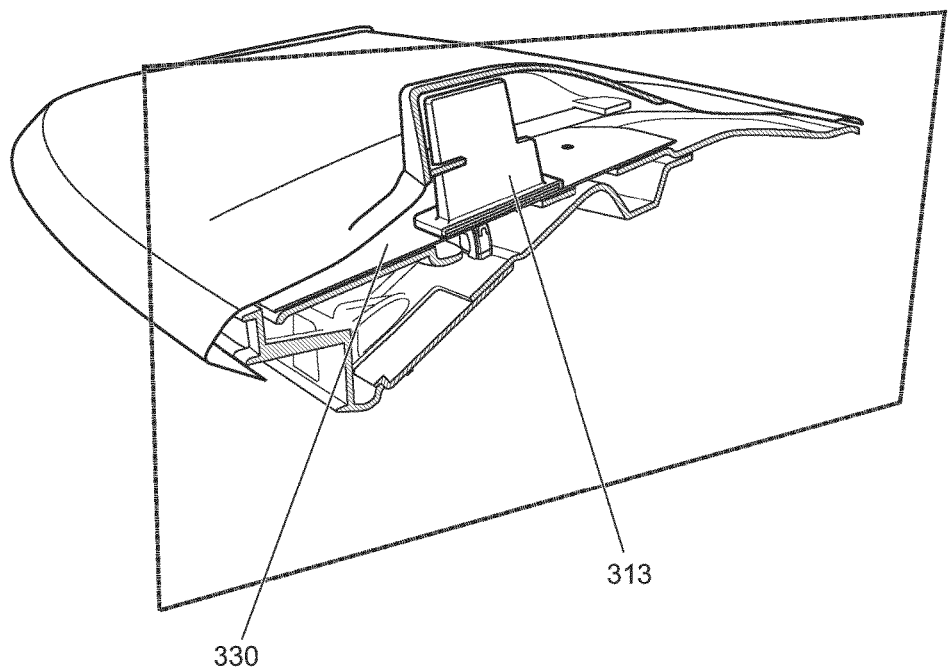
FIG. 5 shows a cut-away illustration of an antenna array according to an embodiment of the invention mounted upon an aerodynamic device.

As shown in FIG. 5, which illustrates a cut-through of the aerodynamic device of FIG. 6 through radome 310, an upper portion of the radome may be removeable as previously described. The ground plane 330 having antennas 311, 321, 322 mounted thereon is arranged within the aerodynamic device with a major planar surface of the ground plane 330 parallel to the surface of the aerodynamic device. The antennas 311, 321, 322 are arranged to extend upwardly from the ground plane 330 and aerodynamic device.

The antennas 311, 321, 322 within the fins 310, 320 may be arranged at a predetermined distance apart. The spacing between antennas may be greater than 50 mm or greater than 100 mm, although it will be realised that other spacing distances may be chosen.

The spacing may be chosen appropriately for the frequency of signals received or transmitted by the antennas. In particular the spacing may be chosen based upon a longest wavelength to be received or transmitted by the antennas 311, 321, 322. Advantageously the spacing of the antennas provides decorrelation between the antennas 311, 321, 322 in different fins 310, 320. That is, where one or more antennas in one of the fins 310 is used to transmit data and one or more antennas in the other fin 320 used to receive data the spacing prevents the receive antenna receiving data transmitted from the transmit antenna. In FIG. 3 a spacing of the antennas in the lateral axis 111 may be 100 mm to provide an approximate 10 dB decorrelation (for an omnidirectional antenna) depending upon the design of antenna element, its matching and directionality. In some embodiments, where the antennas 311, 321, 322 are used for telecommunications in a 4G telecommunications band based on Long Term Evolution (LTE) in a 2.6 GHz frequency band the antennas in each fin may be spaced 101 mm apart in the lateral axis 111. In some embodiments the wavelengths transmitted and received by the antennas 311, 321, 322 may be between 0.42 m and 0.05 m. The distance apart of the antennas may be linked to the longest wavelength. The distance may be determined as greater than ¼ wavelength for low coupling paths, but may, in other embodiments, be greater than 1 wavelength.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

Further aspects of the present invention are set out in the following numbered paragraphs:

1. An aerodynamic device for a vehicle, comprising one or more antenna elements arranged to extend from a surface of the aerodynamic device.
2. The aerodynamic device of paragraph 1, wherein the one or more antenna elements are generally aligned with a longitudinal axis;
3. The aerodynamic device of paragraph 2, wherein the longitudinal axis is that of the vehicle.
4. The aerodynamic device of paragraph 1, wherein the one or more antenna elements are patch antennas.
5. The aerodynamic device of paragraph 4, wherein each patch antenna has a polygonal shape; optionally the shape is T or L-shaped.
6. The aerodynamic device of paragraph 1, comprising a plurality of antenna elements.
7. The aerodynamic device of paragraph 6, wherein at least some of the antenna elements are spaced apart in a lateral axis.
8. The aerodynamic device of paragraph 7, wherein the antenna elements are spaced apart to decorrellate the antennas.
9. The aerodynamic device of paragraph 7, wherein the antenna elements are spaced apart by at least one quarter of a wavelength.
10. The aerodynamic device of paragraph 7, wherein the antenna elements are spaced apart by at least 1 mm, 10 mm or 50 mm.
11. The aerodynamic device of paragraph 7, wherein the antenna elements are spaced apart by approximately 100 mm; optionally the antenna elements are space apart by approximately 101 mm.
12. The aerodynamic device of paragraph 6, comprising at least four antenna elements.
13. The aerodynamic device of paragraph 4, wherein at least two antenna elements are aligned in the longitudinal axis.
14. The aerodynamic device of paragraph 12, wherein at least first and second pairs of antenna elements are spaced apart in the lateral axis.
15. The aerodynamic device of paragraph 1, wherein the one or more antenna elements extend from an upper surface of the aerodynamic device.
16. The aerodynamic device of paragraph 1, comprising a conductive layer arranged generally perpendicular to the one or more antenna elements.
17. The aerodynamic device of paragraph 16, wherein the conductive layer is arranged to form a ground plane for the one or more antenna elements.
18. The aerodynamic device of paragraph 16, wherein the conductive layer is arranged within the aerodynamic device.
19. The aerodynamic device of paragraph 16, wherein the conductive layer is arranged beneath a surface of the aerodynamic device.
20. The aerodynamic device of paragraph 1, wherein the one or more antenna elements are arranged within one or more radomes.
21. The aerodynamic device of paragraph 20, wherein an upper portion of each radome is removable.
22. The aerodynamic device of paragraph 1, wherein the aerodynamic device is a spoiler.
23. The aerodynamic device of paragraph 1, comprising one or more of an illumination means, a washing means and a wiping means.
24. A vehicle comprising the aerodynamic device of any preceding claim.
25. The vehicle of paragraph 24, wherein the aerodynamic device is arranged at a rear portion of the vehicle.
26. The vehicle of paragraph 24, wherein the aerodynamic device is arranged to form a generally continuous surface with a roof of the vehicle.
27. An antenna array for a vehicle, comprising a plurality of antenna elements spaced apart in a lateral axis of the vehicle.
28. The antenna array of paragraph 27, wherein the antenna elements are generally aligned with a longitudinal axis of the vehicle.
29. The antenna array of paragraph 27, wherein the one or more antenna elements are patch antennas.
30. The antenna array of paragraph 29, wherein each patch antenna has a polygonal shape; optionally the shape is T or L-shaped.
31. The antenna array of paragraph 27, wherein the antenna elements are spaced apart to decorrellate the antennas.
32. The antenna array of paragraph 27, wherein the antenna elements are spaced apart by at least one quarter of a wavelength.
33. The antenna array of paragraph 27, wherein the antenna elements are spaced apart by at least 1 mm, 10 mm or 50 mm.
34. The antenna array of paragraph 27, wherein the antenna elements are spaced apart by approximately 100 mm; optionally the antenna elements are space apart by approximately 101 mm.
35. The antenna array of paragraph 27, comprising one or more further antenna elements aligned with one or more of the antenna elements in the longitudinal axis.
36. The antenna array of paragraph 35, wherein each of the further antenna elements is aligned with one of the antenna elements in the longitudinal axis.
37. The antenna array of paragraph 35, comprising at least two antenna elements aligned in the longitudinal axis.

38. The antenna array of paragraph 27, wherein the plurality of antenna elements are arranged within a plurality of antenna fins each spaced in the lateral axis of the vehicle.

39. The antenna array of paragraph 38, wherein the plurality of antenna fins are generally symmetric about a central longitudinal axis of the vehicle.

40. The antenna array of paragraph 38, wherein each antenna fin is arranged to enclose a plurality of antenna elements.

41. The antenna array of paragraph 27, wherein the plurality of antenna elements are arranged upon an aerodynamic device.

42. The antenna array of paragraph 41, wherein the plurality of antenna elements are arranged to extend upwardly from an upper surface of the aerodynamic device.

43. The antenna array of paragraph 41, wherein the aerodynamic device is a spoiler.

44. The antenna array of paragraph 27, comprising a conductive layer arranged generally perpendicular to the antenna elements.

45. The aerodynamic device of paragraph 44, wherein the conductive layer is arranged to form a ground plane for the one or more antenna elements.

46. The aerodynamic device of paragraph 44, wherein the conductive layer is arranged within the aerodynamic device.

47. The antenna array of paragraph 20, wherein the plurality of antenna elements are for mounting upon a roof of the vehicle.

48. A vehicle comprising the antenna array of paragraph 27.

The invention claimed is:

1. An aerodynamic device for a vehicle, the aerodynamic device comprising:
    first and second radomes, the first radome comprising a first antenna element and the second radome comprising a second antenna element, the first and second antenna elements extending from a surface of the aerodynamic device, wherein both of the first and second antenna elements are generally aligned with a first axis, and wherein the first and second antenna elements are spaced apart along a second axis perpendicular to the first axis; and
    a conductive layer oriented generally perpendicular to the first and second antenna elements, wherein the first and second antenna elements extend upwardly from the conductive layer and the conductive layer provides a common ground plane for the first and second antenna elements.

2. The aerodynamic device of claim 1, wherein the first and second antenna elements are configured to transmit and/or receive signals at wavelengths between 0.42 m and 0.05 m.

3. The aerodynamic device of claim 1, wherein the first axis is a longitudinal axis of the vehicle and the second axis is a lateral axis of the vehicle.

4. The aerodynamic device of claim 1, wherein the first and second antenna elements are patch antennas.

5. The aerodynamic device of claim 4, wherein each patch antenna has a polygonal shape.

6. The aerodynamic device of claim 1, wherein the first and second antenna elements are spaced apart such that the first and second antennas are decorrelated.

7. The aerodynamic device of claim 6, wherein the first and second antenna elements are spaced apart by at least one quarter of a wavelength.

8. The aerodynamic device of claim 1, wherein the first and second antenna elements are spaced apart along the second axis by at least 50 mm, and wherein the first and second antenna elements are spaced apart along the second axis by less than 200 mm.

9. The aerodynamic device of claim 1, wherein the first and second antenna elements are spaced apart along the second axis by at least 100 mm.

10. The aerodynamic device of claim 9, wherein the first and second antenna elements are spaced apart along the second axis by 101 mm.

11. The aerodynamic device of claim 1, further comprising at least two additional antenna elements, and/or wherein each of the first and second antenna elements comprises a pair of antenna elements.

12. The aerodynamic device of claim 1, wherein one or more of the first and second antenna elements extend from an upper surface of the aerodynamic device.

13. The aerodynamic device of claim 1, wherein the conductive layer is positioned within the aerodynamic device.

14. The aerodynamic device of claim 1, wherein the conductive layer is positioned beneath a surface of the aerodynamic device.

15. The aerodynamic device of claim 1, wherein an upper portion of the first radome and/or the second radome is removable.

16. The aerodynamic device of claim 1, further comprising at least one light emitting device, a window washing apparatus, and/or a window wiping apparatus.

17. A vehicle comprising the aerodynamic device of claim 1.

18. The vehicle of claim 17, wherein the aerodynamic device is a spoiler positioned at a rear portion of the vehicle.

19. The vehicle of claim 17, wherein the aerodynamic device is a spoiler configured to form a generally continuous surface with a roof of the vehicle.

20. The aerodynamic device of claim 1, wherein at least a portion of each of the first and second radomes is formed integrally with the aerodynamic device.

* * * * *